(12) United States Patent
Hietalahti et al.

(10) Patent No.: US 12,418,770 B2
(45) Date of Patent: Sep. 16, 2025

(54) APPARATUS, METHODS, AND COMPUTER PROGRAMS

(71) Applicant: NOKIA TECHNOLOGIES OY, Espoo (FI)

(72) Inventors: Hannu Petri Hietalahti, Kiviniemi (FI); Mao Cai, Chengdu (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 363 days.

(21) Appl. No.: 17/737,468

(22) Filed: May 5, 2022

(65) Prior Publication Data

US 2022/0360939 A1   Nov. 10, 2022

(51) Int. Cl.
*H04W 24/00* (2009.01)
*G01S 5/00* (2006.01)
*G01S 5/02* (2010.01)
*H04W 4/021* (2018.01)
*H04W 64/00* (2009.01)

(52) U.S. Cl.
CPC .......... *H04W 4/021* (2013.01); *G01S 5/0036* (2013.01); *G01S 5/0244* (2020.05); *H04W 64/00* (2013.01)

(58) Field of Classification Search
CPC ..... H04W 4/021; H04W 64/00; H04W 48/04; G01S 5/0036; G01S 5/0244; G01S 5/014
See application file for complete search history.

(56) References Cited

U.S. PATENT DOCUMENTS

| | | | | |
|---|---|---|---|---|
| 5,432,841 | A * | 7/1995 | Rimer | H04W 64/00 455/457 |
| 8,112,785 | B1 * | 2/2012 | Cooley | H04W 12/37 342/450 |
| 8,989,779 | B1 * | 3/2015 | Centore, III | H04W 4/90 455/456.2 |
| 9,619,989 | B1 * | 4/2017 | Ewing | H04L 49/201 |
| 11,006,264 | B1 * | 5/2021 | Takla | H04W 28/22 |
| 11,323,949 | B2 * | 5/2022 | Juhasz | H04M 1/72463 |

(Continued)

FOREIGN PATENT DOCUMENTS

| CN | 101483872 A | 7/2009 |
|---|---|---|
| CN | 102714857 A | 10/2012 |

(Continued)

OTHER PUBLICATIONS

3GPP TS 23.032 V17.0.0 (Mar. 2021), Technical Specification, 3rd Generation Partnership Project; Technical Specification Group Services and System Aspects; Universal Geographical Area Description (GAD) (Release 17), Mar. 2021.

(Continued)

*Primary Examiner* — Stephen M D'Agosta
(74) *Attorney, Agent, or Firm* — SQUIRE PATTON BOGGS (US) LLP

(57) ABSTRACT

There is provided a method for an apparatus for a location service, the method comprising: receiving, from a network function, a location request to determine a location of a terminal, the location request comprising a first indication of a first area: determining whether the terminal is inside or outside of the first area; and sending, to the network function, a second indication of whether the terminal is inside or outside of the first area.

12 Claims, 12 Drawing Sheets

(56) References Cited

U.S. PATENT DOCUMENTS

| | | | | |
|---|---|---|---|---|
| 2002/0019226 A1* | 2/2002 | Ezuriko | H04W 48/02 455/522 |
| 2002/0026364 A1* | 2/2002 | Mayer | G06Q 30/02 705/15 |
| 2002/0032032 A1* | 3/2002 | Haumont | H04W 36/38 455/445 |
| 2003/0008644 A1* | 1/2003 | Akhterzzaman | H04W 48/04 455/418 |
| 2003/0078080 A1* | 4/2003 | Miriyala | H04W 48/04 455/528 |
| 2003/0134626 A1* | 7/2003 | Himmel | H04M 1/642 455/567 |
| 2003/0148775 A1* | 8/2003 | Spriestersbach | H04L 67/04 455/456.1 |
| 2004/0203846 A1* | 10/2004 | Caronni | H04L 63/0492 455/41.1 |
| 2005/0197752 A1* | 9/2005 | Yang | G05D 1/0261 701/23 |
| 2007/0099631 A1* | 5/2007 | Lai | H04M 1/663 455/456.1 |
| 2008/0043993 A1* | 2/2008 | Johnson | H04K 3/80 379/386 |
| 2008/0076447 A1* | 3/2008 | Duxbury | H04W 64/00 455/456.1 |
| 2008/0107090 A1* | 5/2008 | Thomson | H04W 12/64 370/338 |
| 2008/0114829 A1* | 5/2008 | Button | H04L 67/63 709/203 |
| 2010/0014497 A1* | 1/2010 | Aggarwal | H04W 4/10 455/518 |
| 2010/0227581 A1* | 9/2010 | Cook | H04W 4/02 455/411 |
| 2011/0117916 A1* | 5/2011 | Dahlen | H04W 48/08 455/436 |
| 2011/0140956 A1* | 6/2011 | Henry | G01S 19/34 342/450 |
| 2012/0202524 A1* | 8/2012 | Wachter | H04W 4/20 455/456.2 |
| 2013/0324100 A1* | 12/2013 | Ohashi | H04W 4/029 455/418 |
| 2014/0295884 A1* | 10/2014 | Racz | H04W 24/10 455/456.1 |
| 2015/0011188 A1* | 1/2015 | Chou | H04M 1/663 455/411 |
| 2019/0128683 A1* | 5/2019 | Kristinsson | H04W 4/024 |
| 2021/0099932 A1* | 4/2021 | Khanka | H04W 36/302 |

FOREIGN PATENT DOCUMENTS

| | | |
|---|---|---|
| CN | 109673046 A | 4/2019 |
| CN | 110198520 A | 9/2019 |

OTHER PUBLICATIONS

3GPP TR 38.821 V16.0.0 (Dec. 2019), Technical Report, 3rd Generation Partnership Project; Technical Specification Group Radio Access Network; Solutions for NR to support non-terrestrial networks (NTN) (Release 16), Dec. 2019.

3GPP TS 23.502 V17.0.0 (Mar. 2021), Technical Specification, 3rd Generation Partnership Project; Technical Specification Group Services and System Aspects; Procedures for the 5G System (5GS); Stage 2 (Release 17), Mar. 2021.

3GPP TS 23.273 V17.0.0 (Mar. 2021), Technical Specification, 3rd Generation Partnership Project; Technical Specification Group Services and System Aspects; 5G System (5GS) Location Services (LCS); Stage 2 (Release 17), Mar. 2021.

3GPP TR 23.737 V17.2.0 (Mar. 2021), Technical Report, 3rd Generation Partnership Project; Technical Specification Group Services and System Aspects; Study on architecture aspects for using satellite access in 5G (Release 17), Mar. 2021.

International Search Report and Written Opinion dated Jan. 26, 2022 corresponding to International Patent Application No. PCT/CN2021/092212.

M. Thomson et al., "Representation of Uncertainty and Confidence in the Presence Information Data Format Location Object (PIDF-LO)," Internet Engineering Task Force (IETF), RFC 7459, Feb. 2015.

* cited by examiner

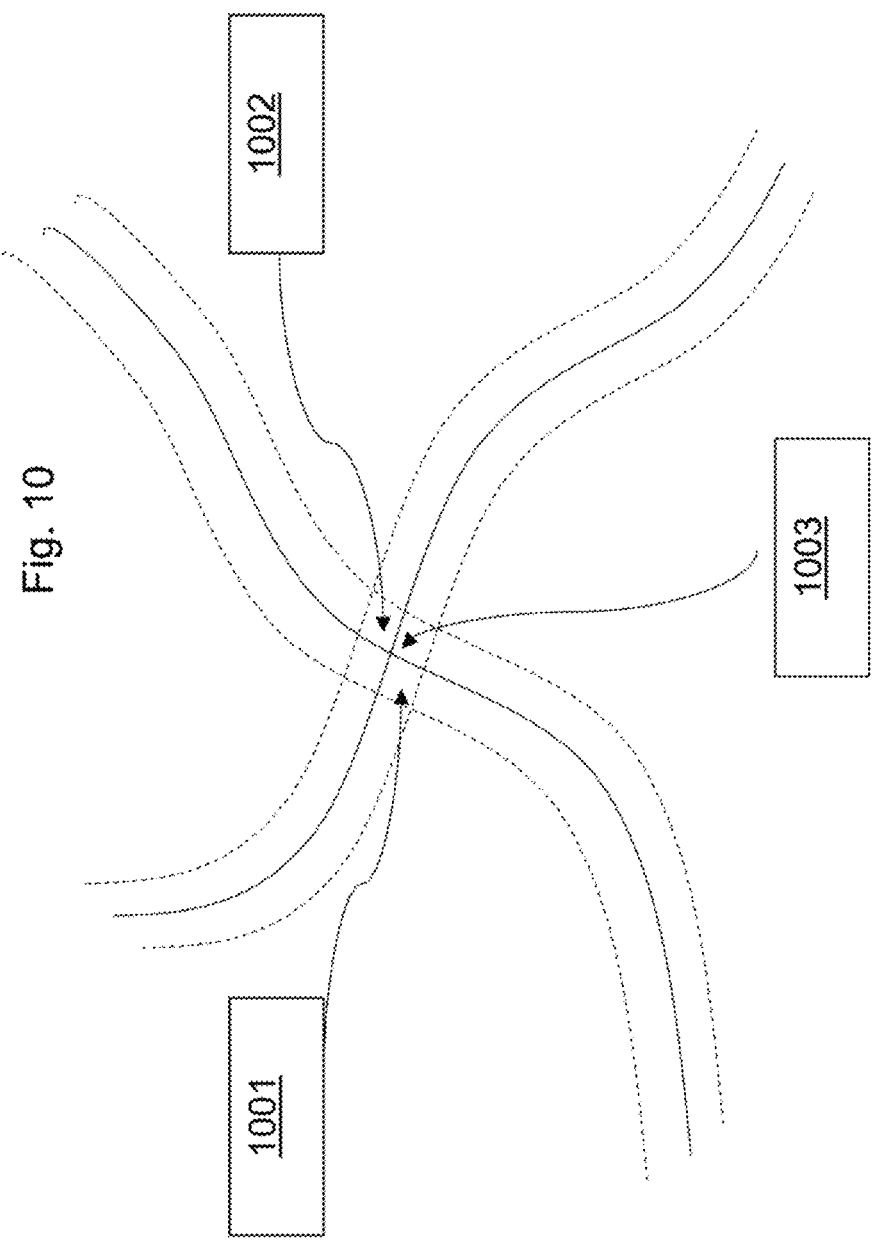

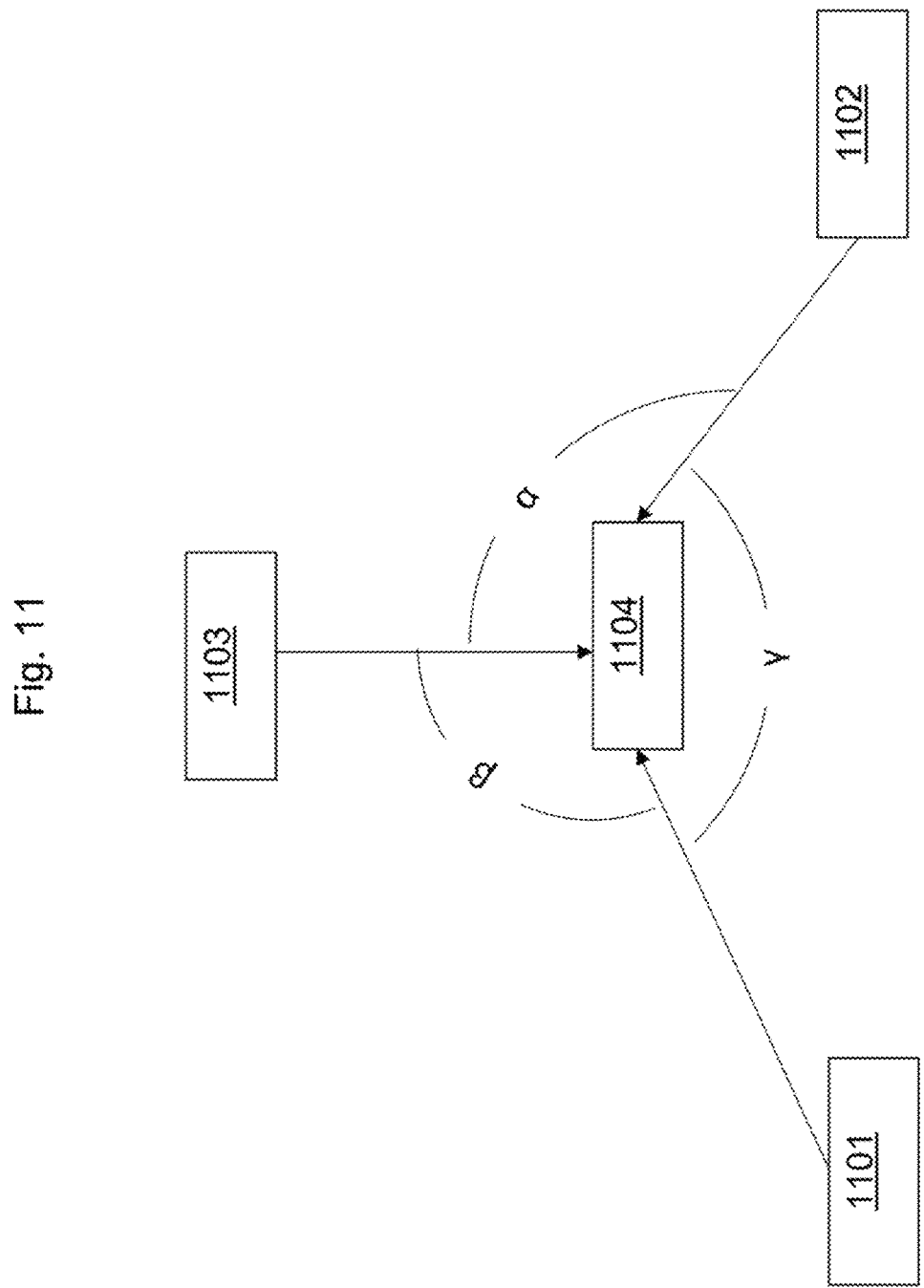

APPARATUS, METHODS, AND COMPUTER PROGRAMS

CROSS REFERENCE TO RELATED APPLICATION

This application claims priority to International Patent Application No. PCT/CN2021/092212, filed on May 7, 2021, which is incorporated herein by reference in its entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a location service, the apparatus comprising: means for receiving, from a network function, a location request to determine a location of a terminal, the location request comprising a first indication of a first area; means for determining whether the terminal is inside or outside of the first area; and means for sending, to the network function, a second indication of whether the terminal is inside or outside of the first area.

The means for determining whether the terminal is inside or outside of the first area may comprise: means for determining a first location for the terminal with a first level of accuracy; and means for using the first location and first level of accuracy to determine whether the terminal is inside or outside of the first area.

The means for determining whether the terminal is inside or outside of the first area may comprise: means for determining a second location for the terminal with a second level of accuracy, the second level of accuracy providing a more accurate location than the first level of accuracy; and means for using the second location and second level of accuracy to determine whether the terminal is inside or outside of the first area.

The apparatus may comprise means for, when it is determined that the terminal is close to a boundary of the first area, using a higher level of accuracy for determining whether the terminal is inside or outside of the first area than when it is determined that the terminal is not close to the boundary of the first area.

The location request may comprise mobility information associated with the terminal, and the means for determining whether the terminal is inside or outside of the first area may use the mobility information.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a second aspect, there is provided an apparatus for a network function, the apparatus comprising: means for sending, to a location service, a location request to determine a location of a terminal, the location request comprising a first indication of a first area; means for receiving, from the location service, a second indication of whether the terminal is inside or outside of the first area; and means for using the second indication to determine whether to restrict network access to the terminal.

The apparatus may comprise: means for receiving, from the terminal, an access request for the network before the location request is sent; and means for allowing the terminal to access the network before the second indication is received; wherein the means for using the second indication to determine whether to restrict network access to the terminal may comprise means for determining whether to stop the terminal from accessing the network when the second indication is received.

The apparatus may comprise means for determining the first area using at least one of a round trip time, a time difference of arrival, an angle of arrival, an angle of departure, and/or timing advance positioning techniques.

The apparatus may comprise means for determining that the terminal is close to a border of the first area before sending the request to the location service.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a third aspect, there is provided an apparatus for a location service, the apparatus comprising: at least one processor; and at least one memory comprising computer code that, when executed by the at least one processor, causes the apparatus to: receive, from a network function, a location request to determine a location of a terminal, the location request comprising a first indication of a first area; determine whether the terminal is inside or outside of the first area; and send, to the network function, a second indication of whether the terminal is inside or outside of the first area.

The determine whether the terminal is inside or outside of the first area may cause the apparatus to: determine a first location for the terminal with a first level of accuracy; and use the first location and first level of accuracy to determine whether the terminal is inside or outside of the first area.

The determine whether the terminal is inside or outside of the first area may cause the apparatus to: determine a second location for the terminal with a second level of accuracy, the second level of accuracy providing a more accurate location than the first level of accuracy; and use the second location and second level of accuracy to determine whether the terminal is inside or outside of the first area.

The apparatus may be caused to, when it is determined that the terminal is close to a boundary of the first area, use a higher level of accuracy for determining whether the terminal is inside or outside of the first area than when it is determined that the terminal is not close to the boundary of the first area.

The location request may comprise mobility information associated with the terminal, and the determine whether the terminal is inside or outside of the first area may use the mobility information.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a fourth aspect, there is provided an apparatus for a network function, the apparatus comprising at least one processor, and at least one memory comprising computer code that, when executed by the at least one processor, causes the apparatus to: send, to a location service, a location request to determine a location of a terminal, the location request comprising a first indication of a first area; receive, from the location service, a second indication of whether the terminal is inside or outside of the first area; and use the second indication to determine whether to restrict network access to the terminal.

The apparatus may be caused to: receive, from the terminal, an access request for the network before the location request is sent; and allow the terminal to access the network before the second indication is received; wherein the use the second indication to determine whether to restrict network access to the terminal may comprise determining whether to stop the terminal from accessing the network when the second indication is received.

The apparatus may be caused to determine the first area using at least one of a round trip time, a time difference of arrival, an angle of arrival, an angle of departure, and/or timing advance positioning techniques.

The apparatus may be caused to determine that the terminal is close to a border of the first area before sending the request to the location service.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a fifth aspect, there is provided a method for an apparatus for a location service, the method comprising: receiving, from a network function, a location request to determine a location of a terminal, the location request comprising a first indication of a first area; determining whether the terminal is inside or outside of the first area; and sending, to the network function, a second indication of whether the terminal is inside or outside of the first area.

The determining whether the terminal is inside or outside of the first area may comprise: determining a first location for the terminal with a first level of accuracy; and using the first location and first level of accuracy to determine whether the terminal is inside or outside of the first area.

The determining whether the terminal is inside or outside of the first area may comprise: determining a second location for the terminal with a second level of accuracy, the second level of accuracy providing a more accurate location than the first level of accuracy; and using the second location and second level of accuracy to determine whether the terminal is inside or outside of the first area.

The method may comprise, when it is determined that the terminal is close to a boundary of the first area, using a higher level of accuracy for determining whether the terminal is inside or outside of the first area than when it is determined that the terminal is not close to the boundary of the first area.

The location request may comprise mobility information associated with the terminal, and the determining whether the terminal is inside or outside of the first area may use the mobility information.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a sixth aspect, there is provided a method for an apparatus for a network function, the method comprising: sending, to a location service, a location request to determine a location of a terminal, the location request comprising a first indication of a first area; receiving, from the location service, a second indication of whether the terminal is inside or outside of the first area; and using the second indication to determine whether to restrict network access to the terminal.

The method may comprise: receiving, from the terminal, an access request for the network before the location request is sent; and allowing the terminal to access the network before the second indication is received; wherein the using the second indication to determine whether to restrict network access to the terminal may comprise determining whether to stop the terminal from accessing the network when the second indication is received.

The method may comprise determining the first area using at least one of a round trip time, a time difference of arrival, an angle of arrival, an angle of departure, and/or timing advance positioning techniques.

The method may comprise determining that the terminal is close to a border of the first area before sending the request to the location service.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a seventh aspect, there is provided an apparatus for a location service, the apparatus comprising: receiving circuitry for receiving, from a network function, a location request to determine a location of a terminal, the location request comprising a first indication of a first area; determining circuitry for determining whether the terminal is inside or outside of the first area; and sending circuitry for sending, to the network function, a second indication of whether the terminal is inside or outside of the first area.

The determining circuitry for determining whether the terminal is inside or outside of the first area may comprise: determining circuitry for determining a first location for the terminal with a first level of accuracy; and using circuitry for using the first location and first level of accuracy to determine whether the terminal is inside or outside of the first area.

The determining circuitry for determining whether the terminal is inside or outside of the first area may comprise: determining circuitry for determining a second location for the terminal with a second level of accuracy, the second level of accuracy providing a more accurate location than the first level of accuracy; and using circuitry for using the second location and second level of accuracy to determine whether the terminal is inside or outside of the first area.

The apparatus may comprise using circuitry for, when it is determined that the terminal is close to a boundary of the first area, using a higher level of accuracy for determining whether the terminal is inside or outside of the first area than when it is determined that the terminal is not close to the boundary of the first area.

The location request may comprise mobility information associated with the terminal, and the determining circuitry for determining whether the terminal is inside or outside of the first area may use the mobility information.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to an eighth aspect, there is provided an apparatus for a network function, the apparatus comprising: sending circuitry for sending, to a location service, a location request to determine a location of a terminal, the location request comprising a first indication of a first area; receiving circuitry for receiving, from the location service, a second indication of whether the terminal is inside or outside of the first area; and using circuitry for using the second indication to determine whether to restrict network access to the terminal.

The apparatus may comprise: receiving circuitry for receiving, from the terminal, an access request for the network before the location request is sent; and allowing circuitry for allowing the terminal to access the network before the second indication is received; wherein the using circuitry for using the second indication to determine whether to restrict network access to the terminal may comprise determining circuitry for determining whether to stop the terminal from accessing the network when the second indication is received.

The apparatus may comprise determining circuitry for determining the first area using at least one of a round trip time, a time difference of arrival, an angle of arrival, an angle of departure, and/or timing advance positioning techniques.

The apparatus may comprise determining circuitry for determining that the terminal is close to a border of the first area before sending the request to the location service.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a ninth aspect, there is provided non-transitory computer readable medium comprising program instructions for causing an apparatus for a location service to perform at least the following: receive, from a network function, a location request to determine a location of a terminal, the location request comprising a first indication of a first area; determine whether the terminal is inside or outside of the first area; and send, to the network function, a second indication of whether the terminal is inside or outside of the first area.

The determine whether the terminal is inside or outside of the first area may cause the apparatus to: determine a first location for the terminal with a first level of accuracy; and use the first location and first level of accuracy to determine whether the terminal is inside or outside of the first area.

The determine whether the terminal is inside or outside of the first area may cause the apparatus to: determine a second location for the terminal with a second level of accuracy, the second level of accuracy providing a more accurate location than the first level of accuracy; and use the second location and second level of accuracy to determine whether the terminal is inside or outside of the first area.

The apparatus may be caused to, when it is determined that the terminal is close to a boundary of the first area, use a higher level of accuracy for determining whether the terminal is inside or outside of the first area than when it is determined that the terminal is not close to the boundary of the first area.

The location request may comprise mobility information associated with the terminal, and the determine whether the terminal is inside or outside of the first area may use the mobility information.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to a tenth aspect, there is provided non-transitory computer readable medium comprising program instructions for causing an apparatus for a network function to perform at least the following: send, to a location service, a location request to determine a location of a terminal, the location request comprising a first indication of a first area; receive, from the location service, a second indication of whether the terminal is inside or outside of the first area; and use the second indication to determine whether to restrict network access to the terminal.

The apparatus may be caused to: receive, from the terminal, an access request for the network before the location request is sent; and allow the terminal to access the network before the second indication is received; wherein the use the second indication to determine whether to restrict network access to the terminal may comprise determining whether to stop the terminal from accessing the network when the second indication is received.

The apparatus may be caused to determine the first area using at least one of a round trip time, a time difference of arrival, an angle of arrival, an angle of departure, and/or timing advance positioning techniques.

The apparatus may be caused to determine that the terminal is close to a border of the first area before sending the request to the location service.

The location request may comprise mobility information associated with the terminal.

The first area may comprise multiple countries. For example, the first area may be a coverage area provided by a satellite access node.

The second indication may be comprised in an information element associated with at least two values, one value indicating that the terminal is inside of the first area, and the other value indicating that the terminal is outside of the first area.

The first area may comprise one of: a restricted region, and an allowed region.

According to an eleventh aspect, there is provided a computer program comprising program instructions for causing a computer to perform any method as described above.

According to a twelfth aspect, there is provided a computer program product stored on a medium that may cause an apparatus to perform any method as described herein.

According to a thirteenth aspect, there is provided an electronic device that may comprise apparatus as described herein.

According to a fourteenth aspect, there is provided a chipset that may comprise an apparatus as described herein.

BRIEF DESCRIPTION OF FIGURES

Examples will now be described, by way of example only, with reference to the accompanying Figures in which:

FIGS. 8 to 11 illustrate different user equipment positioning mechanisms.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
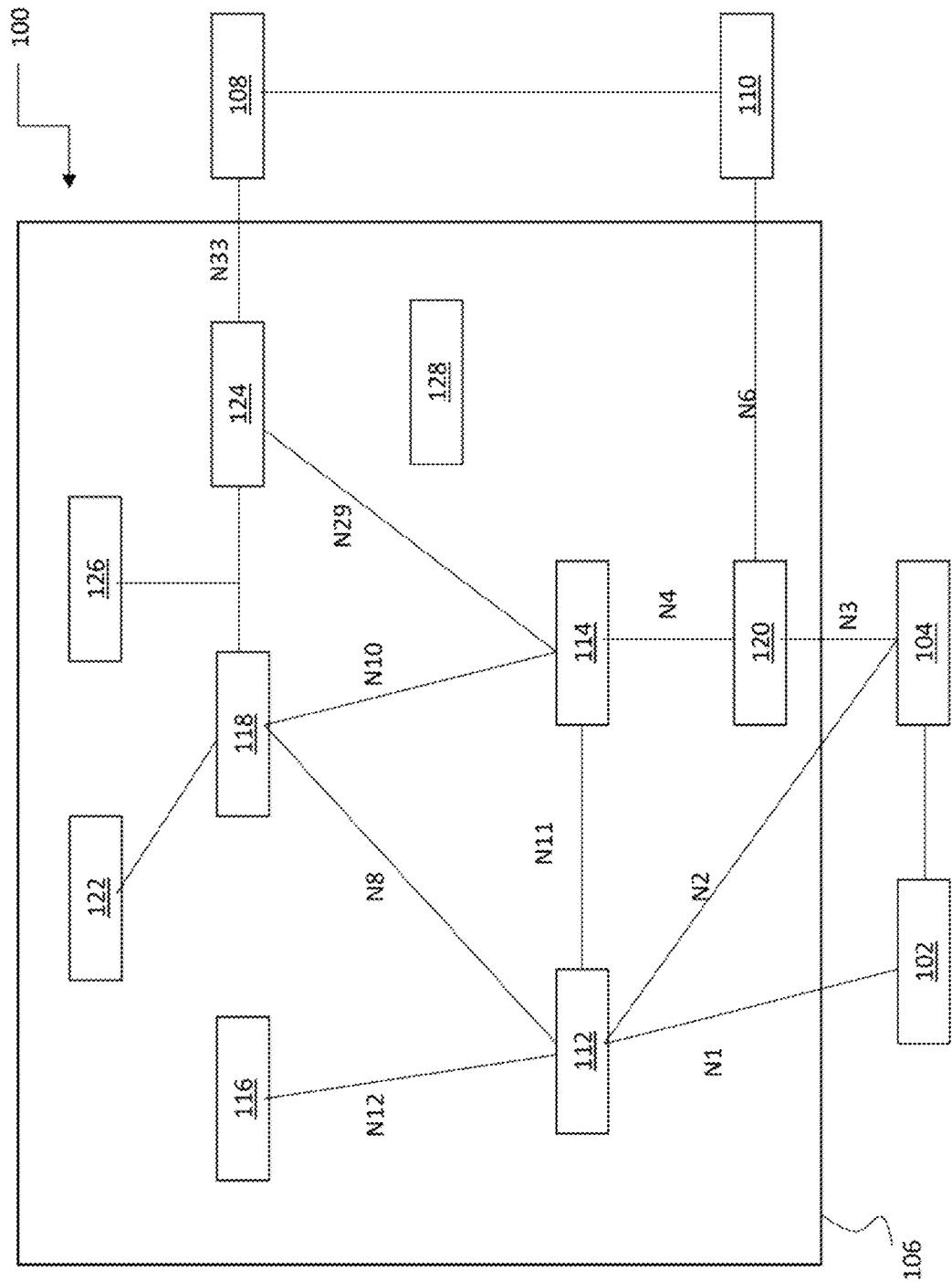
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

3GPP refers to a group of organizations that develop and release different standardized communication protocols. 3GPP is currently developing and publishing documents related to Release 16, relating to 5G technology, with Release 17 currently being scheduled for 2022.

Part of this work relates to PLMN public land mobile network (PLMN) selection for providing a UE with access to a communication network. A PLMN is a combination of wireless communication services offered by a specific operator in a specific country. A PLMN may comprise several different cellular technologies, like GSM/2G, UMTS/3G, LTE/4G, offered by a single operator within a given country. The operating license of each PLMN is granted by the local authorities in each country, and it allows each PLMN to operate in that jurisdiction, but not in the other countries/countries not covered by the operating license. In terrestrial systems, the radio network coverage area is designed to follow the national borders with reasonable accuracy. This inaccuracy of PLMN coverage area leaking slightly across the border is an accepted fact, and network operators have tools to address this in the border areas.

A problem arises when considering super-national cell coverage areas i.e. coverage areas that span multiple jurisdictions/countries. This may arise, for example, during satellite provision of 5G network access, which 3GPP Radio Access Network (RAN) groups estimate will ultimately span up to 450 km (see, for example, 3GPP Technical Report (TR) 38.821). Such extremely large single cell coverage area will unavoidably leak substantially across country borders. Consequently, a new mechanism to control a UE's access to available PLMNs is being considered. One of these considered mechanisms is based on a change of the UEs PLMN selection rules to limit the UE to select only those PLMN candidates that are available in the same country as the present UE location. Since there are both financial issues and regulatory requirements at stake, the network may use certain mechanisms to enforce the UEs PLMN selection. This mechanism assumes that currently specified procedures are enhanced to allow the network to obtain a network-determined UE location, although how exactly this UE location enhancement is to be done is not yet specified.

In some mechanisms, a cell identifier and a tracking area (which includes an identifier for the PLMN ID) are used by the network to determine a country in which a UE is currently located. However, for NR satellite access to the network, the cell size can be multi-national (i.e. covering multiple countries/jurisdictions). In such a case, the Cell ID granularity is not a good enough estimate for determining a jurisdiction in which the UE is currently located.

Figure 5:
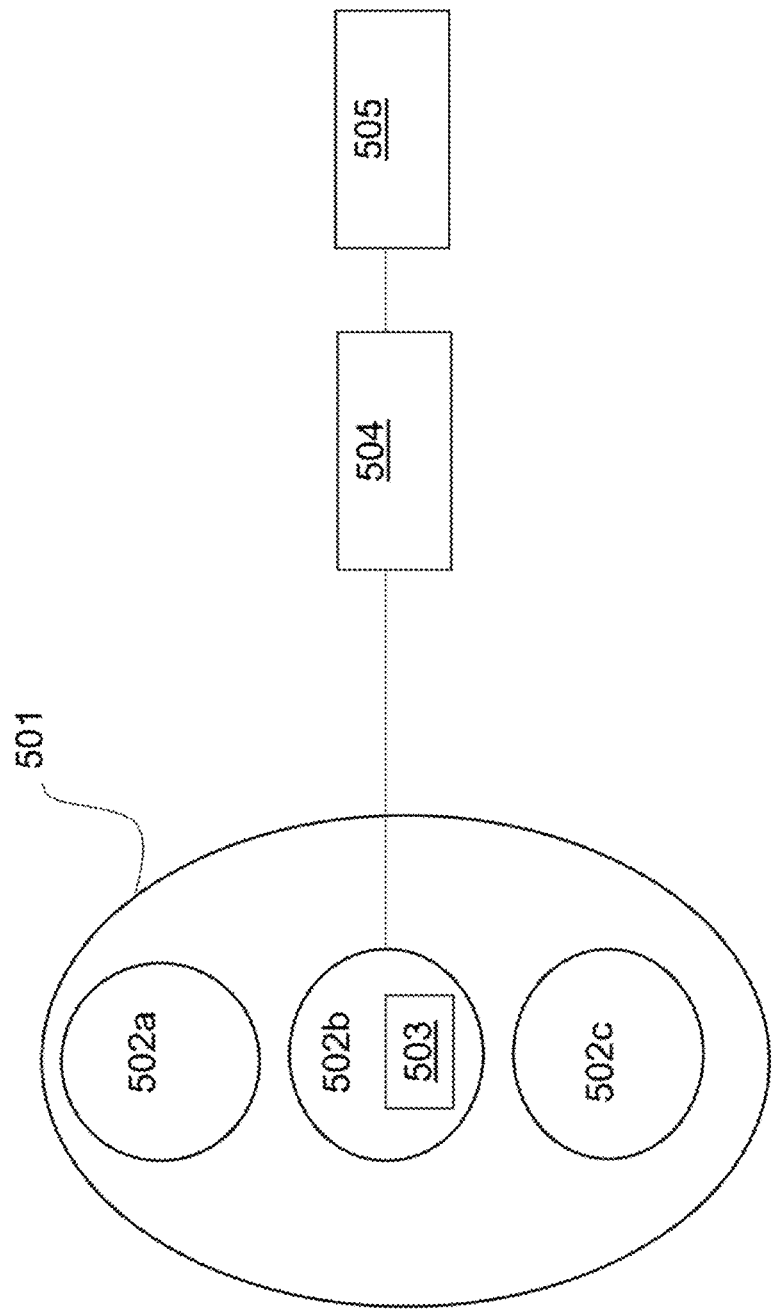
FIG. 5 shows a schematic representation of an example network.

This is illustrated with respect to FIG. 5.

FIG. 5 shows a satellite coverage area 501 that encompasses at least part of three different countries, 502A, 502B and 502C. A UE 503 is currently located in country 502B. The entity providing satellite access via coverage area 501 is labelled as 504, with satellite system earth station in country 502B being labelled as 505.

In FIG. 5, the UE 503 may be able to use all PLMNs allowed in countries 502A, 502B and 502C, with each of these allowed PLMNs only being allowed to operate within the area of their own country. In the roaming situation of FIG. 5, the UE 503 is only allowed to select among PLMNs of Country B 502B, and the network must be able to police this UE selection. The policing by the network is to avoid theft of service by avoiding roaming charges and criminal activity avoiding lawful interception, which can only be initiated by the public authorities of the same country as the UE location.

Principles for networks enforcing a UE's PLMN selection by determining a location of a UE have been specified in some 3GPP documents, including 3GPP TR 23.737.

In 3GPP TR 23.737, the LCS may be provided, at least in part, by a Location Management Function (LMF) and/or an enhanced-Serving Mobile Location Center (e-SMLC), which each decide whether a UE's registration is allowed. An LCS by LMF/(e)SMLC provides a UE location by providing a "Geographical Area Description" (GAD) shape in response to a location query from a network function. The GAD shape is defined in 3GPP TS 23.032, and may be used for converting a radio plan location into a physical location. The GAD shape may be provided to the requesting network function along with a confidence value associated with that shape, the confidence value indicating how accurate the LCS believes the provided GAD shape to be. A suitable confidence value is the confidence value currently defined in RFC 7459. The confidence of the location shape uses the normal distribution. The distribution function is continuous. However, there are areas where measurements go beyond the physical possibilities or topology of signal sources, which isn't reflected in the normal distribution. In other words, the Geographical Area Description shape can't show the nature of the impossibilities of physical situations.

Figure 6:
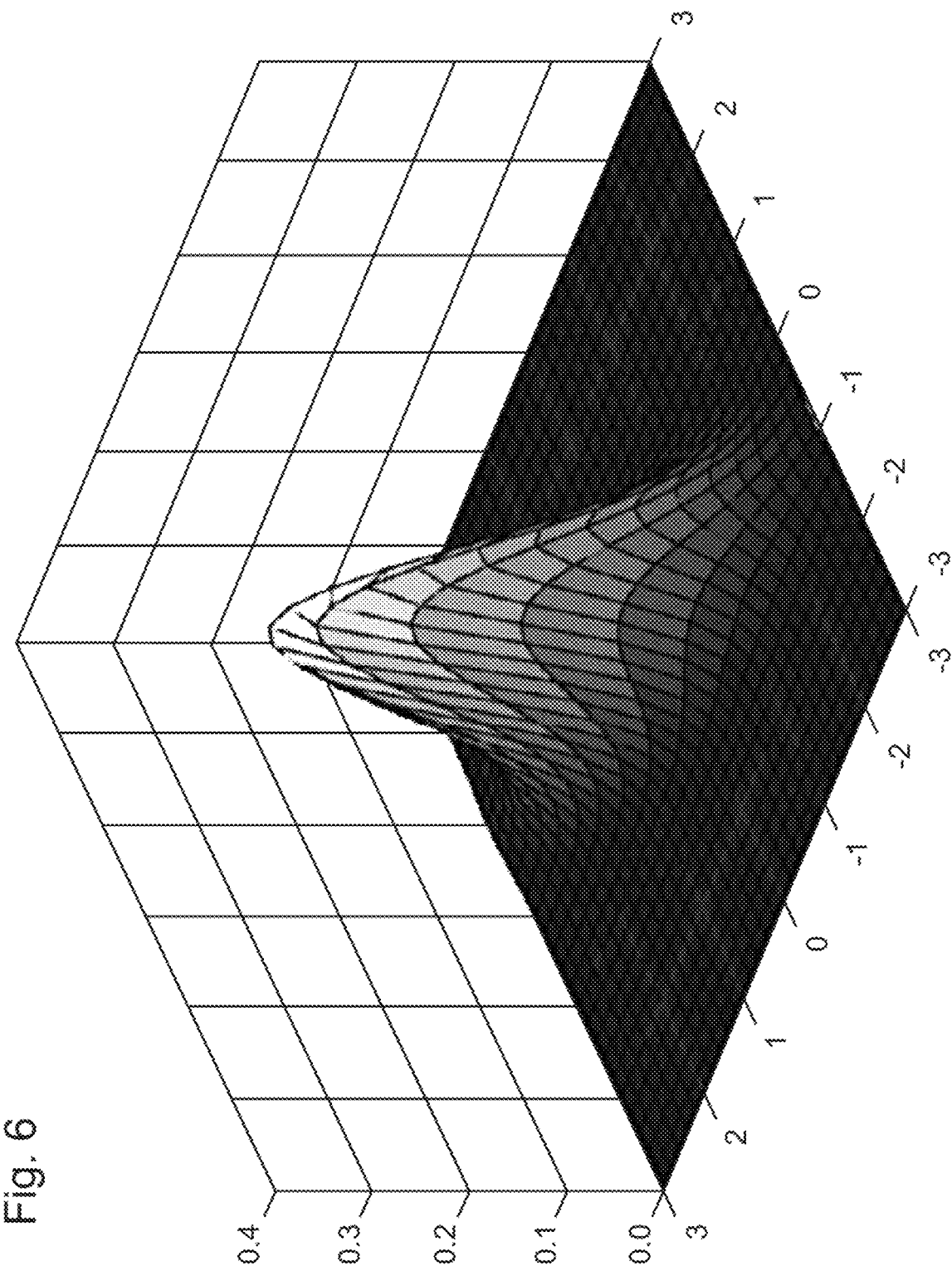
FIG. 6 shows an example user equipment location.

A GAD shape is illustrated in FIG. 6, which shows probabilistically where a UE may be located. However, it may be that the area spanning −1 to −3 on the y axis and −3 to +3 on the x axis defines a rectangular area that is an area within which the UE cannot be. This "restricted region" is not described by the normal distribution of the GAD shape. The possibility of UE being in this restricted region should be 0%. However, the normal distribution may still show a small value of a chance of the UE being located there, which could mislead the core network's regulatory processing logic.

Awareness of the UE's expected or known mobility can be either observed by the network or provisioned in the form of "Expected UE behaviour" parameters, which are currently specified in 3GPP Technical Specification (TS)

23.502. Table 4.15.6.3-1 of this document is replicated below. The "Expected UE Moving Trajectory" and "Stationary Indication" parameters are especially useful for guiding an AMF to understand and to predict the UE's mobility pattern with high accuracy. These parameters can be provisioned per subscription, and provided to the LCS for determining a UE location.

TABLE 1

UE behaviour parameters that may be provided to a location service

| Expected UE Behaviour parameter | Description |
|---|---|
| Expected UE Moving Trajectory | Identifies the UE's expected geographical movement Example: A planned path of movement |
| Stationary Indication | Identifies whether the UE is stationary or mobile |
| Communication Duration Time | Indicates for how long the UE will normally stay in Connection mode-Connected for data transmission. Example: 5 minutes. |
| Periodic Time | Interval Time of periodic communication Example: every hour. |
| Scheduled Communication Time | Time and day of the week when the UE is available for communication. Example: Time: 13:00-20:00, Day: Monday. |
| Battery Indication | Identifies power consumption criticality for the UE: if the UE is battery powered with not rechargeable/not replaceable battery, battery powered with rechargeable/replaceable battery, or not battery powered. |
| Traffic Profile | Identifies the type of data transmission: single packet transmission (uplink (UL) or downlink (DL)), dual packet transmission (UL with subsequent DL or DL with subsequent UL), multiple packets transmission |
| Scheduled Communication Type | Indicates that the Scheduled Communication Type is Downlink only or Uplink only or Bi-directional [To be used together with Scheduled Communication Time] Example: <Scheduled Communication Time>, DL only. |
| Expected Time and Day of Week in Trajectory | Identifies the time and day of week when the UE is expected to be at each location included in the Expected UE Moving Trajectory. |

In view of the above, it would be useful to provide a new kind of UE location procedure that can determine the UE location by country granularity as quickly and as accurately as possible to avoid delaying and misjudging completion of an ongoing procedures, such as non-access stratum (NAS) procedures. Non-access stratum (NAS) is a functional layer in the UMTS and LTE wireless telecom protocol stacks between the core network and user equipment. This layer is used to manage the establishment of communication sessions and for maintaining continuous communications with the user equipment as it moves. Consequently, NAS procedures may include messages such as Registration Request, Service Request and/or Protocol Data Unit (PDU) session establishment request.

The following relates to a mechanism for determining the position of a UE for enabling access to a communication network, including enabling access to services provided via the communication network. This is to enable, a network function, such as an AMF, to ask a location service, such as an LMF, whether a UE is inside or outside a certain area.

Although the following is largely described in terms of country-level granularity and using 5G terminology, it is understood that the presently described techniques are not so limited. The presently described techniques may apply more generally to non-5G technologies. The presently described techniques may apply to any geodetic area.

In other words, the following does not need to be limited to country borders, and any form of geodetic area(s) can be applied. For example, there may be defined restricted regions that the UE is not allowed to be located in, and the request may indicate that it is a request to determine whether the UE is outside of this restricted region. The restricted region may come from national or regional regulations, or other requirements. This restricted region may be defined as a GAD shape. A restricted region may be determined using at least one of a plurality of different positioning methods. For example, as discussed in more detail below, these plurality of positioning methods may comprise Timing Advance, Multiple Round Trip Time, Time Difference of Arrival, and Angle of Arrival/Angle of Departure positioning methods.

As a particular example, the following describes at least one mechanism by which an AMF can indicate to the LMF that the AMF needs the UE location by country granularity. The AMF may also indicate an urgency for this information as part of this request, since the AMF's response to the UE depends on the outcome of the UE location procedure. The urgency may comprise at least one of a priority for the request, a type of client, and/or a type of service.

The UE positioning herein described may have different accuracy requirements than any previously known UE location procedure, and the applied accuracy may be variable based on an approximate current location of a UE. For instance, for emergency call positioning, it is next to useless to know that the UE is somewhere in Paris. However, for the sake of ensuring the UE is registering to French PLMNs only, this is a perfectly good UE location estimate. On the other hand, when the UE is closer to a border area of an allowed area, the accuracy requirement for the AMF may become more stringent. The terrestrial network legacy allows the new radio satellite access system to target accuracy that is comparable to terrestrial network radio network coverage area accuracy at the border areas.

This UE location procedure may be executed during non-access stratum procedures.

When the location service receives a location request as herein described from the network function, the location service may use an indication in the location request as to the purpose of the measurement to determine the accuracy of the UE positioning provided in response to the location request. If information is already available to the location service (and/or information is very readily available) that is determined to reliably place the UE within a restricted region (and/or obviously outside of an restricted region), then that UE location information is returned by the location service to the network function. This may be performed as soon as possible, without the location service obtaining a more granular location information than an indication that the UE is outside of the restricted region. This may allow for a fast and reliable decision process based on positioning signals from telecom cells.

When the location service is unable to determine whether a UE is outside of a restricted region using information already available to the location service and/or information very readily available (e.g. if the location service is unable to determine a country in which the UE is currently located), then the location service may initiate a higher precision UE positioning determination to determine the UE location within more reliably. In this case, as the information about the UE's current location takes longer to determine, the network function may initially accept the UE initiated NAS procedure. However, the network function may deregister/prevent access to the network the UE if the LMF later returns the UE location in a country that is different from the Mobile Country Code of the UEs Registered PLMN after the completion of the NAS procedure.

When this technique is implemented into existing 5G systems (and/or later communication protocols, such as 6G etc.), it may be introduced by comprising a new parameter added to the existing Nlmf_Location_DetermineLocation service mechanisms. The Nlmf_Location service enables a network function to request location determination (current geodetic and optionally civic location) for a target UE or to request periodic or triggered location for a target UE (e.g. using a HTTP POST message). The new parameter may indicate a defined region for the location service to determine whether the UE is inside or outside of the defined region. However, it is understood that a different location message may be introduced to convey this request, depending on the specific implementation.

The presently described positioning enhancements may be implemented on its own without any further additions or optimizations (i.e. independently of other mechanisms). However, as a more specific example, when the AMF has a very good idea of the UE's movement, the AMF can take advantage of its awareness of the UE's predicted or observed mobility. The AMF may be aware of the UE's predicted or observed mobility by, for example, RAN-observed and/or core network-observed UE mobility, and/or if the communication network has provisioned and/or configured itself or the UE in response to recent UE mobility. The UE's predicted, and/or well-known and strictly limited behaviour (such as in the case of some telemetry devices) can be provisioned in the "Expected UE behaviour" parameters that are specified in 3GPP TS 23.502.

This additional optimisation enables the AMF to optionally avoid excessive UE location requests to the LMF by considering the observed or provisioned UE mobility itself.

For example, when a UE is detected to be registered in the middle of a country, far away from the borders and provisioned with "static" parameter in its Expected UE Behaviour parameters, then the AMF may assume that the UE is accessing the network from the same location. In this case, the AMF may relieve the signalling load caused by UE location by verifying the UE's location less frequently than for the other users that are determined to be more mobile.

As another, complementary, example, when a UE is provisioned with "Expected UE Moving Trajectory" that takes it across the border to another country, then the AMF may increase the positioning accuracy required for a UE location when the UE is approaching the border.

It is understood that even if a UE is not provisioned with any "Expected UE Behaviour" parameters, the AMF may still use its own observed awareness of the UE's location and velocity etc. to determine how frequently to request for network-based UE location from the LMF.

Figure 7:
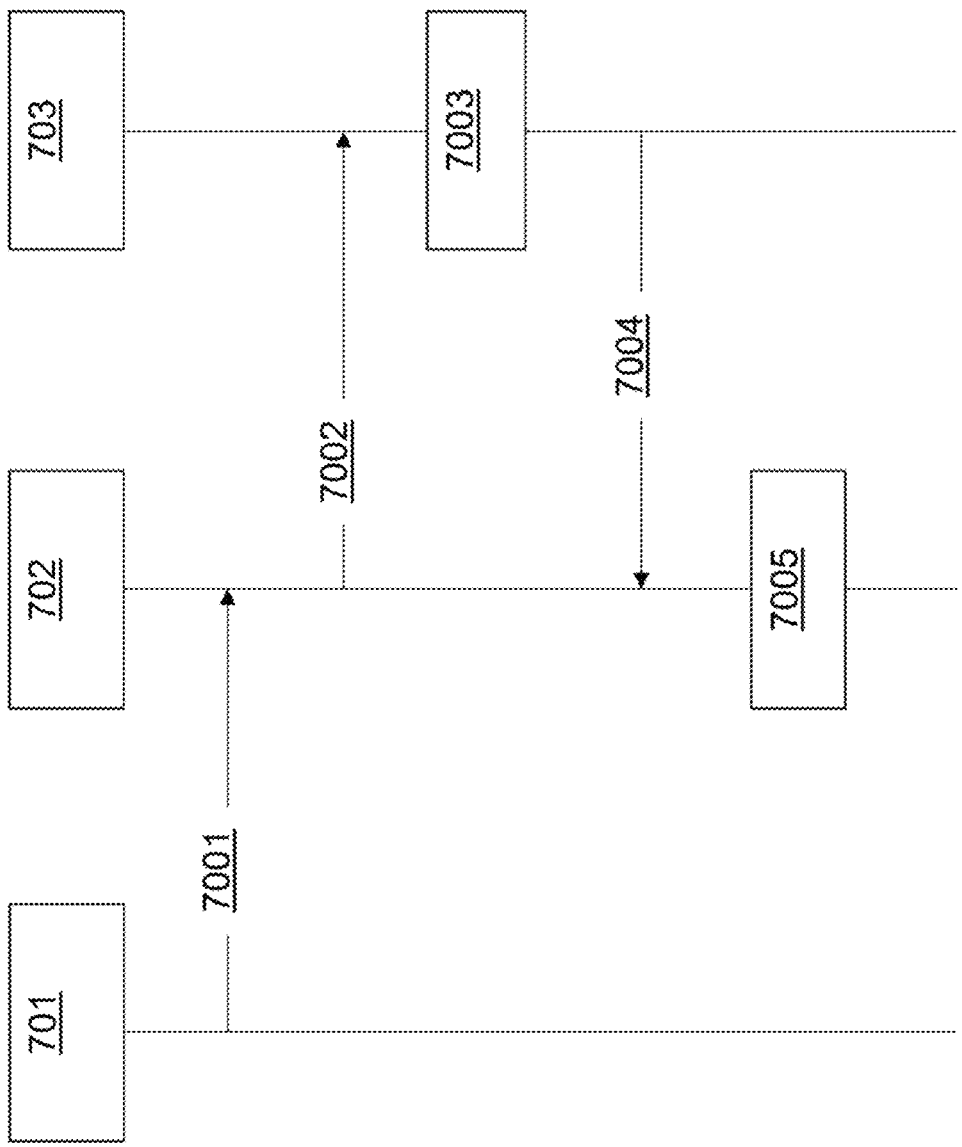
FIG. 7 is an example signalling diagram illustrating potential signalling between apparatus described herein.

A potential signalling mechanism for implementing the present disclosure to a specific 5G system is provided in FIG. 7. It is understood that this is to showcase how certain aspects may be implemented, and that the presently described techniques may be applied to other communication systems. This signalling mechanism may be implemented into a plurality of different 3GPP Technical Specifications, including 3GPP TS 23.273, and 3GPP TR 23.737.

FIG. 7 illustrates signalling between a UE 701, an AMF 702 and an LMF 703.

At 7001, the UE 701 signals AMF 702. This signalling may be, for example, NAS-related signalling, such as registration, and/or session establishment, and/or a Service Request (including Control Plane Service Request for consumer Internet-of-Things (CIoT)). The request may be made when the UE is located within a super-national cell coverage, or an area within which registration of session establishment is considered to be geodetically restricted. As a specific, non-limiting example, the request to establish a session may be a request to establish a Protocol Data Unit (PDU) session.

At 7002, the AMF 702 signals LMF 703 in response to the signalling of 7001. This signalling requests, from the LMF, an indication of whether the UE is inside or outside of at least one restricted area. This request may be made as part of a request to the LMF to determine a current location of the UE. For example, the request may be made as part of a Nlmf_Location_DetermineLocation service operation towards the LMF to request the current location of the UE 701. This request may be considered to be a Network Initiated Location Request (NI-LR). The presently disclosed request may indicate a granularity of the result to be provided back to the AMF/location service consumer. This request may request possibilities of the UE being inside or outside of a defined area. This request may additionally comprise a request for a current location of the UE.

The signalling to the LMF 703 from the AMF 702 may comprise at least one identifier of an entity communicating with the UE 701 for assisting the LMF in determining a current location of the UE 701. For example, the request may comprise an LCS Correlation identifier, the serving cell identity of the Primary Cell in the Master RAN node and the Primary Cell in the Secondary RAN node when available based on Dual Connectivity scenarios, and an indication of a location request from a regulatory services client (e.g., emergency services). The LCS correlation identifier is used for matching up location service requests and responses. This request may additionally comprise an indication of whether (or not) the UE supports an LTE Positioning Protocol (LPP), a required QoS, and Supported Geographical Area Description shapes. When the serving cell of the UE overlaps with the restricted geodetic area, the AMF may include the restricted area (described as a GAD shape) in the request to the LMF 703 as well.

At 7003, the LMF 703 determines a UE location. This determination may use information received from the AMF at 7002. The determination is performed in response to the signalling of 7002. This determination may comprise determining possibilities of the UE being located inside or outside of the defined area.

At 7004, the LMF 703 responds to the AMF's signalling of 7002 to return the current location of the UE. Using the above location request example, this response may be a Nlmf_Location_DetermineLocation Response towards the AMF 702. The signalling may comprise at least one of the LCS Correlation identifier, the location estimate, the age and accuracy of the location estimate, and may include information about the positioning method. When the restricted area parameter is included in the request, an indication of whether the UE is inside or outside the area is also comprised in the response.

At 7005, the AMF 702 makes a decision regarding whether to accept or reject the UE's request of 7001. This decision may use at least the indication of whether the UE is inside or outside the area is also comprised in the response. In particular, when the UE is indicated as being outside the restricted area, the request of 7001 may be accepted. When the UE is indicated as being inside the restricted area, the request of 7001 may be rejected. Although not shown, this decision may be signalled to the UE.

Therefore, as a more specific example of the present disclosure, existing procedures from current 3GPP technical specifications (such as 3GPP TS 23.273, and 3GPP TR 23.737) may be extended in at least one of the following ways. For example, when the AMF wants to know a UE's positional relationship to at least one restricted region, the AMF may define the at least one restricted region as a respective GAD shape, and send the defined shape(s) to a location service (e.g. an LMF) as an input parameter for performing a location service. This GAD shape may serve as an implicit indication that possibilities of the UE being inside or outside of the restricted region are being requested from the location service. However, it is understood that the AMF may provide a separate indication to the location service requesting possibilities of the UE being located inside or outside of the restricted region. The currently defined "Nlmf_Location_DetermineLocation service operation may subsequently be extended to include using at least one provided GAD shape of at least one restricted region as an input, and the possibilities of the UE being inside or outside restricted region(s) as an output.

The following discusses potential mechanisms that can be used to model/determine a model for a restricted region, and may be used by the AMF to determine a restricted region within which the UE may not be allowed for registration or certain services according to respective regulations.

Polygons can approximate other shapes with necessary vertices. In this example, all geodetic areas are described by at least one polygon.

The first considered example relates to determining a restricted region using timing advance (TA) positioning techniques. In this example, the radio signal cannot cover the places beyond the TA (Timing Advance) limit, D, where $\Delta d$ is an absolute value of maximum measurement error.

Figure 8:
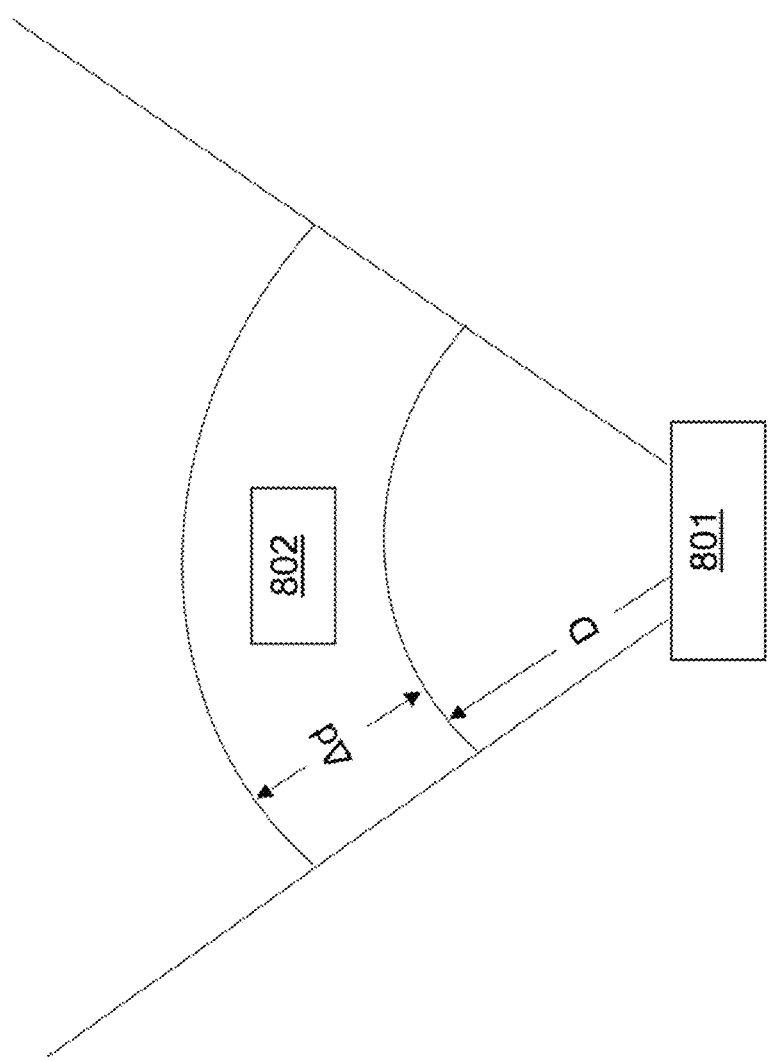

This example is illustrated with respect to FIG. 8.

FIG. 8 illustrates a serving cell 801 configured to communicate with a UE 802. In a first area, marked by the radius D, the serving cell has a low confidence area having a non-line-of-sight signal. $\Delta d$ is an absolute value of maximum measurement and is additional length to the radius D, defining an area of high confidence. The area beyond $\Delta d$ is considered to be a restricted region.

The second considered example relates to determining a restricted region using round trip time (RTT) calculaations. In this example, for all vertices of an area, the signal cannot travel further than a maximum allowed time. Therefore, when a vertex's displacement to a celli is greater than $RTT_i + \Delta d$, then the region is considered to be a restricted region.

Figure 9:
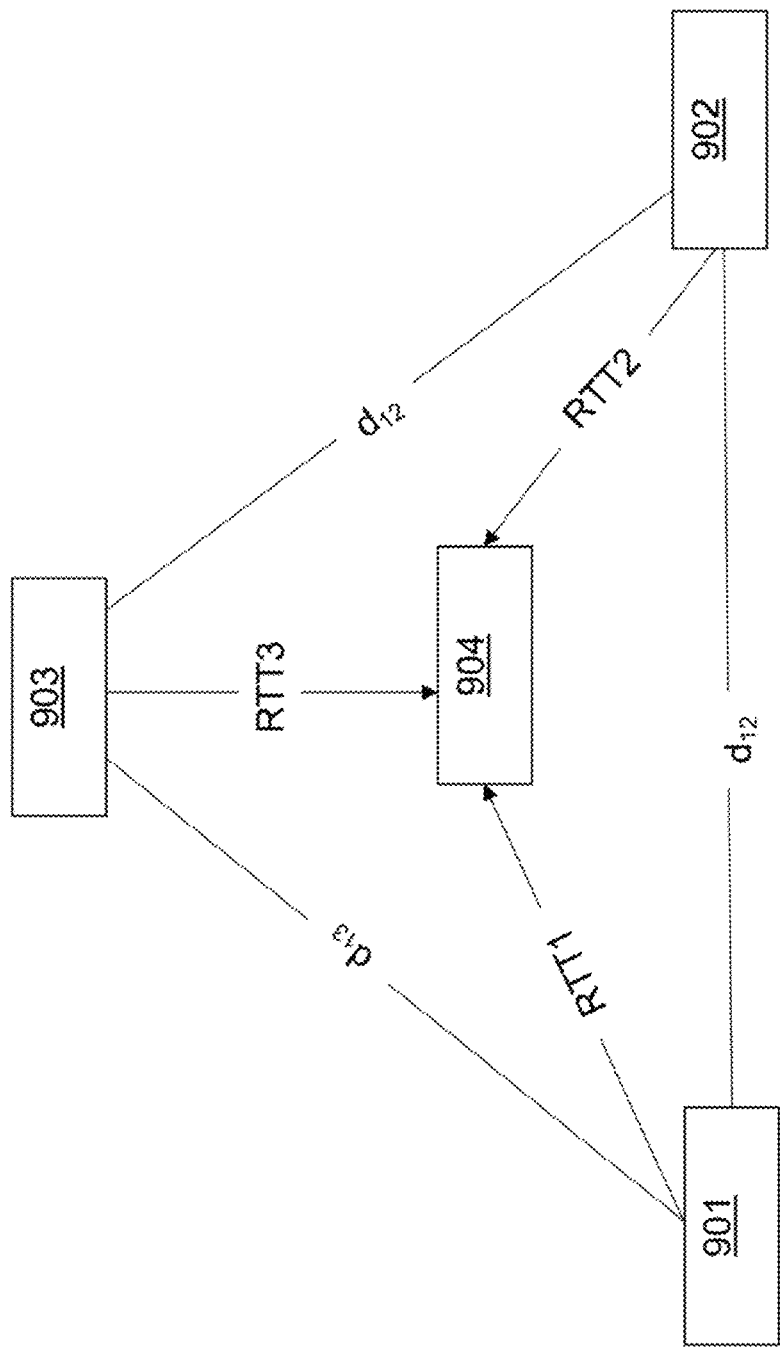

This is illustrated with respect to FIG. 9.

FIG. 9 shows a first cell provided by a first access point 901, a second cell provided by a second access point 902, and a third cell provided by a third access point 903, each cell providing a respective coverage area. A UE 904 is located in an overlapping coverage area of the first, second, and third cells. The RTT from the first access point 901 to the UE 904 is labelled as RTT1. The RTT from the second access point 902 to the UE 904 is labelled as RTT2. The RTT from the third access point 903 to the UE 904 is labelled as $RTT_3$. The distance between the first and second access points is labelled as $d_{12}$. The distance between the first and third access points is labelled as $d_{13}$. The distance between the second and third access points is labelled as $d_{23}$. In this example, the area inside the Cells' triangle is considered to be a restricted region when $RTT1+RTT2+RTT3 > \min[(d_{13}+d_{23}),(d_{13}+d_{12}),(d_{12}+d_{23})]+\Delta d$.

The following considers determining a restricted area using Time Difference of Arrival (TDOA) techniques.

This is considered with respect to FIG. 10.

FIG. 10 shows a first cell provided by a first access point 1001, a second cell provided by a second access point 1002, and a third cell provided by a third access point 1003, each cell providing a respective coverage area. The time taken for a signal from the first access point 1001 to arrive at a UE (not shown) is labelled as $T_1$. The time taken for a signal from the second access point 1002 to arrive at a UE (not shown) is labelled as $T_2$. The time taken for a signal from the third access point 1003 to arrive at a UE (not shown) is labelled as $T_3$. A contour/line representing the difference between $T_3$ and $T_1$ is a solid line labelled as $T_3-T_1$ (also referred to as $RSTD_{31}$ in the following, where RSTD stands for Reference Signal Time Difference). Either side of this solid line are dashed lines. These dashed lines represent an uncertainty in the measurement of the difference between $T_3$ and $T_1$. A contour/line representing the difference between T2 and $T_1$ is a solid line labelled as $T2-T_1$ (also referred to as $RSTD_{21}$ in the following). Either side of this solid line are dashed lines. These dashed lines represent an uncertainty in the measurement of the difference between $T_2$ and $T_1$.

Assuming any two vertex, $vertex_i$, $vertex_j$, on the edge of a polygon area, if for all the $vertex_i$ and $vertex_j$, when the following is valid:

$$\Pi_{ij}(abs((\text{displacement between } vertex_i \text{ and } Cell_a) - (\text{displacement between } vertex_j \text{ and } Cell_b)) - RSTD_{ab} \pm \Delta d) > 0$$

then the UE is considered to be inside a restricted region. In this instance, $\pm\Delta d$ means no matter add or subtract the measurement error to/from the difference of two displacements between UE and each vertex, the results are all the same positive or all the same negative.

The following considers determining a restricted region using Angle of Arrival (AoA) positioning techniques, which equally apply in respect of Angle of Departure (AoD) limitations.

A position calculation based on the Angle of Arrival (AoA) is also called triangulation. Triangulation uses both a distance between the signal generator and the object and also angles to determine the position of an object. For a two-dimensional position determination two angles and one length are required. The "Angle of arrival" refers to the angle at which the signal meets the receiver, and is measured using the delay of the signal ("Time of Flight" TOF). TOF measures the time it takes a signal to travel between an object and a reference point.

This is considered with respect to FIG. 11.

FIG. 11 shows a first cell provided by a first access point 1101, a second cell provided by a second access point 1102, and a third cell provided by a third access point 1103, each cell providing a respective coverage area. A UE 1104 is located in an overlapping coverage area of the first, second, and third cells. For each access point, a direct line from that access point to the UE defines a respective orientation. The angle between this line and a defined orientation (nominally north) defines an angle of arrival. The AoA for the second access point is labelled as β. The AoA for the third access point is labelled as γ. The for the first access point is labelled as α.

In this example, the area outside the Cells' triangle is considered to be a restricted region when $$\text{Max}(\angle\alpha, \angle\beta, \angle\gamma) + \Delta d < 180°$$

The network function making the location request provides an indication of the restricted area to the location service as part of the location request.

Figure 13:
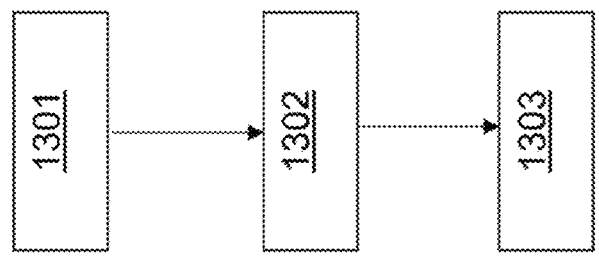
FIGS. 12 and 13 are example flow charts illustrating operations that may be performed by apparatus described herein.
Figure 12:
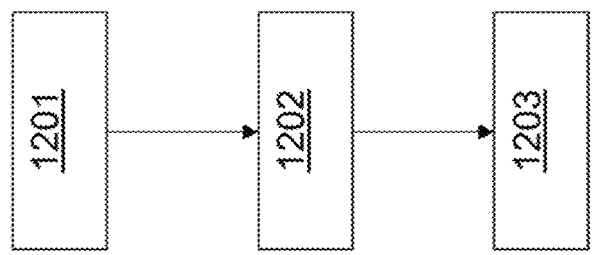

FIGS. 12 and 13 are flow charts illustrating potential operations that may be performed by apparatus performing the mechanisms described herein.

FIG. 12 relates to operations that may be performed by an apparatus for a location service. The apparatus may be, for example, a location management function. This apparatus may perform at least one of the functions described above with respect to location management functions.

At 1201, the apparatus receives, from a network function, a location request to determine a location of a terminal. The request to determine a location of the terminal may indicate a granularity for any location returned to the network function in response to the request. The network function may be a location consumer. For example, the location consumer may be an AMF, as discussed above. The location request comprises a first indication of a first area.

The location request may comprise a request to determine possibilities of the terminal being inside or outside of the first area. The request may be indicated, for example, by a GAD shape. However, it is understood that the request may take another form, such as a separate indication.

The first area may be defined in at least one of a plurality of ways. For example, the first area may be defined by a GAD shape. As another example, the first area may be defined by reference to at least one PLMN, and/or country code.

At 1202, the apparatus determines whether the terminal is inside or outside of the first area.

The determining whether the terminal is inside or outside of the first area may comprise determining possibilities of the terminal being inside or outside the first area. The possibilities may be represented by at least one value of a predetermined parameter, such as a confidence metric in the determined location and/or in an error metric associated with the determined location.

The determining whether the terminal is inside or outside of the first area may comprise determining a first location for the terminal with a first level of accuracy, and using the first location and first level of accuracy to determine whether the terminal is inside or outside of the first area. In this case, the determining whether the terminal is inside or outside of the first area may comprise determining a second location for the terminal with a second level of accuracy, the second level of accuracy providing a more accurate location than the first level of accuracy, and using the second location and second level of accuracy to determine whether the terminal is inside or outside of the first area.

When it is determined that the terminal is close to a boundary of the first area, the apparatus may use a higher level of accuracy for determining whether the terminal is inside or outside of the first area than the apparatus is configured to use when it is determined that the terminal is not close to the boundary of the first area.

At 1203, the apparatus sends, to the network function, a second indication of whether the terminal is inside or outside of the first area.

When the apparatus determines a possibility for the terminal being inside or outside of the first area, this determined possibility may be provided to the network function. The possibilities may be represented by at least one value of a predetermined parameter, such as a confidence metric in the determined location and/or in an error metric associated with the determined location. In this case, the apparatus may provide both a binary indication of whether the terminal is located inside or outside of the first area (e.g. "1" to be inside the first area, and "0" to be outside the first area), along with at least one of the determined possibilities for that result. It is understood that the returned result may simply indicate one of "inside" and "outside", without at least one determined possibility.

The location request may comprise mobility information associated with the terminal. In this case, the determining whether the terminal is inside or outside of the first area may uses the mobility information provided in the request. The mobility information may be as described above in relation to the more specific example. For example, the mobility information may be a terminal's predicted and/or observed mobility by, for example, RAN-observed and/or core network-observed UE mobility, and/or if the communication network has provisioned and/or configured itself or the UE in response to recent UE mobility. The UE's predicted, and/or well-known and strictly limited behaviour (such as in the case of some telemetry devices) can be provisioned in the "Expected UE behaviour" parameters that are specified in 3GPP TS 23.502.

The first area may comprise multiple countries. For example, the first area may be a supernational area provided by satellite coverage.

The second indication may be comprised in an information element associated with at least two values, one value indicating that the terminal is inside of the first area, and the other value indicating that the terminal is outside of the first area.

The first area may comprise one of: a restricted region, and an allowed region. In other words, the location service consumer may ask the location service whether the terminal is at least one of: inside a restricted region, outside a restricted region; inside an allowed region; and outside an allowed region.

Whether the provided first area is a restricted region or an allowed region may be explicitly signalled by a bit value in the provided request to the location service. Whether the provided first area is a restricted region or an allowed region may be defined by an operating communication protocol, without this needing to be explicitly signalled.

Whether the location service consumer is asking whether the terminal is inside or outside the first area may be explicitly signalled by a bit value in the provided request to the location service. Whether the location service consumer is asking whether the terminal is inside or outside the first area may be defined by an operating communication protocol, without this needing to be explicitly signalled.

FIG. 13 is a flow chart illustrating potential operations that may be performed by an apparatus for a network function. The network function may be a location services consumer. The network function may be, for example, an AMF. The apparatus of FIG. 13 may interact with the apparatus of FIG. 12.

At 1301, the apparatus sends, to a location service, a location request to determine a location of a terminal. The location service may be a location management function. The location request comprises a first indication of a first area. The request to determine a location of the terminal may indicate a granularity for any location returned to the network function in response to the request.

The location request may comprise a request to determine possibilities of the terminal being inside or outside of the first area. The request may be indicated, for example, by a GAD shape. However, it is understood that the request may take another form, such as a separate indication.

The first area may be defined in at least one of a plurality of ways. For example, the first area may be defined by a GAD shape. As another example, the first area may be defined by reference to at least one PLMN, and/or country code.

At 1302, the apparatus receives, from the location service, a second indication of whether the terminal is inside or outside of the first area.

The second indication may be accompanied by and/or comprise at least one possibility for the terminal being inside or outside of the first area. This at least one possibility may be represented by at least one value of a predetermined parameter, such as a confidence metric in the determined location and/or in an error metric associated with the determined location. In this case, the apparatus may receive both a binary indication of whether the terminal is located inside or outside of the first area (e.g. "1" to be inside the first area, and "0" to be outside the first area), along with at least one of the determined possibilities for that result. It is understood that the returned result may simply indicate one of "inside" and "outside", without at least one determined possibility.

At 1303, the apparatus uses the second indication to determine whether to restrict network access to the terminal.

The apparatus may receive, from the terminal, an access request for the network before the location request is sent. In this case, the apparatus may allow the terminal to access the network before the second indication is received. Using the second indication to determine whether to restrict network access to the terminal would then comprise determining whether to stop the terminal from accessing the network when the second indication is received.

The apparatus may determine the first area using at least one of a round trip time, a time difference of arrival, an angle of arrival, an angle of departure, and/or timing advance positioning techniques.

The apparatus may determine that the terminal is close to a border of the first area before sending the request to the location service. This may be a prerequisite for the request being sent to the location service.

The location request may comprise mobility information associated with the terminal. For example, the mobility information may be a terminal's predicted and/or observed mobility by, for example, RAN-observed and/or core network-observed UE mobility, and/or if the communication network has provisioned and/or configured itself or the UE in response to recent UE mobility. The UE's predicted, and/or well-known and strictly limited behaviour (such as in the case of some telemetry devices) can be provisioned in the "Expected UE behaviour" parameters that are specified in 3GPP TS 23.502.

The first area may comprise multiple countries. For example, the first area may be a supernational area provided by satellite coverage.

The second indication may be comprised in an information element associated with at least two values, one value indicating that the terminal is inside of the first area, and the other value indicating that the terminal is outside of the first area.

The first area may comprise one of: a restricted region, and an allowed region. In other words, the location service consumer may ask the location service whether the terminal is at least one of: inside a restricted region, outside a restricted region; inside an allowed region; and outside an allowed region.

Whether the provided first area is a restricted region or an allowed region may be explicitly signalled by a bit value in the provided request to the location service. Whether the provided first area is a restricted region or an allowed region may be defined by an operating communication protocol, without this needing to be explicitly signalled.

Whether the location service consumer is asking whether the terminal is inside or outside the first area may be explicitly signalled by a bit value in the provided request to the location service. Whether the location service consumer is asking whether the terminal is inside or outside the first area may be defined by an operating communication protocol, without this needing to be explicitly signalled.

Figure 2:
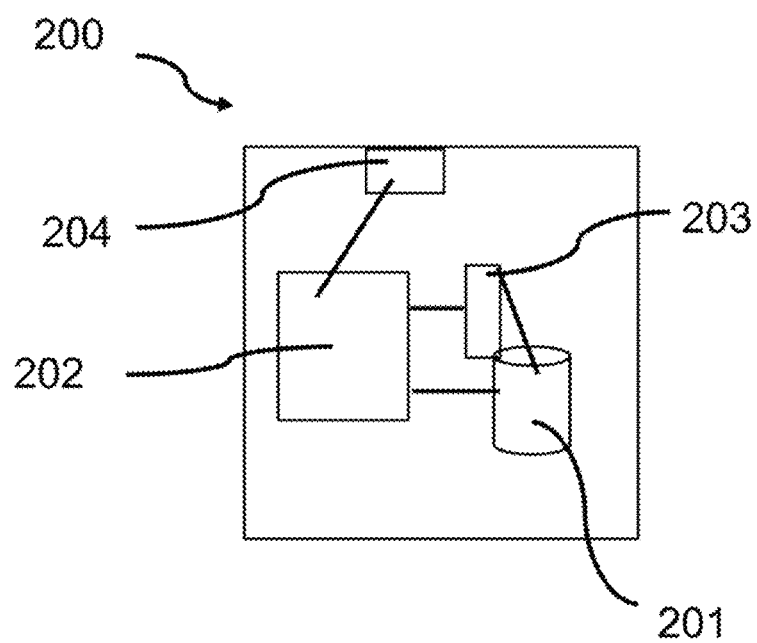
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
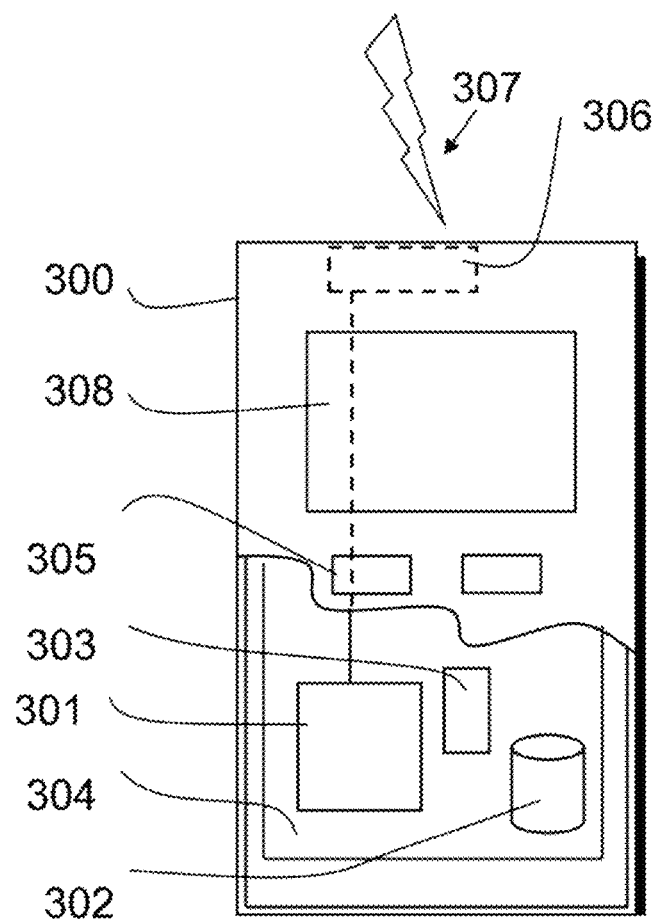
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
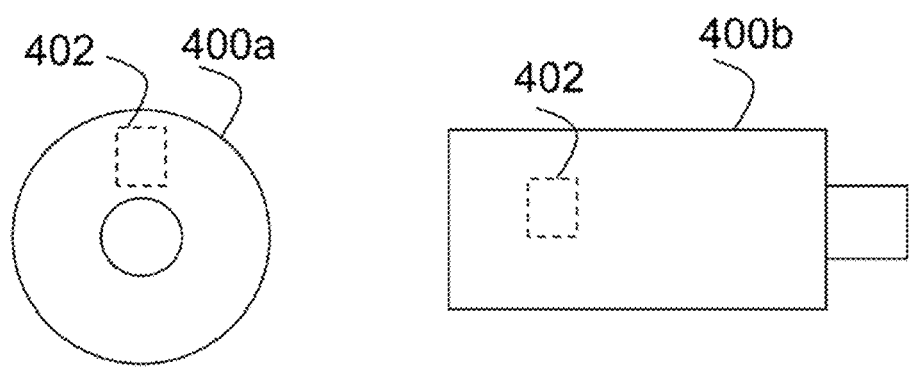
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 12 and/or FIG. 13.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 12 and/or FIG. 13, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus, comprising:
   at least one processor; and
   at least one memory including computer program code which, when executed by the at least one processor, cause the apparatus to perform at least:
   sending, to a location management function or enhanced-serving mobile location center, a location request to determine a location of a terminal, the location request comprising an indication of an area and information for determining an accuracy requirement for the location of the terminal;
   receiving, from the location management function or enhanced-serving mobile location center, an approximate current location of the terminal and an indication of whether the terminal is inside of the area;
   using at least the indication to determine whether to restrict network access to the terminal;
   determining, based on the approximate current location of the terminal and a predicted or observed mobility of the terminal, how frequently to request the location of the terminal from the location management function or enhanced-serving mobile location center;
   sending, based on the determining, to the location management function or enhanced-serving mobile location center, another location request to determine the location of a terminal;
   receiving, from the location management function or enhanced-serving mobile location center, another approximate current location of the terminal and another indication of whether the terminal is inside of the area;
   using at least the another indication to determine whether to restrict network access to the terminal; and
   again determining, after the receiving the another approximate current location and the another indication, based on the another approximate current location of the terminal and the predicted or observed mobility of the terminal, how frequently to request the location of the terminal from the location management function or enhanced-serving mobile location center.

2. The apparatus as claimed in claim 1, wherein the computer program code, when executed by the at least one processor, further causes the apparatus to perform at least:
   receiving, from the terminal, an access request for accessing the network before the location request is sent;
   allowing the terminal to access the network before the indication of whether the terminal is inside of the area is received; and
   stopping the terminal from accessing the network when the indication of whether the terminal is inside of the area indicates that the terminal is not inside of the area.

3. The apparatus as claimed in claim 1, wherein the computer program code, when executed by the at least one processor, further causes the apparatus to perform at least:
   determining that the terminal is close to a border of the area before sending the location request to the location management function or enhanced-serving mobile location center.

4. The apparatus as claimed claim 1, wherein the indication whether the terminal is inside of the area is comprised in an information element associated with at least two values, one value indicating that the terminal is inside of the area, and the other value indicating that the terminal is not inside of the area.

5. The apparatus as claimed in claim 1, wherein the accuracy requirement of the location of the terminal is variable based on an initial approximate current location of the terminal.

6. The apparatus as claimed in claim 1, wherein the apparatus comprises an access management function.

7. A method comprising:
   sending, to a location management function or enhanced-serving mobile location center, a location request to determine a location of a terminal, the location request comprising an indication of an area and information for determining an accuracy requirement for the location of the terminal;
   receiving, from the location management function or enhanced-serving mobile location center, an approximate current location of the terminal and an indication of whether the terminal is inside of the area;
   using at least the indication to determine whether to restrict network access to the terminal;
   determining, based on the approximate current location of the terminal and a predicted or observed mobility of the terminal, how frequently to request the location of the terminal from the location management function or enhanced-serving mobile location center;
   sending, based on the determining, to the location management function or enhanced-serving mobile location center, another location request to determine the location of the terminal;
   receiving, from the location management function or enhanced-serving mobile location center, another approximate current location of the terminal and another indication of whether the terminal is inside of the area;
   using at least the another indication to determine whether to restrict network access to the terminal; and
   again determining, after the receiving the another approximate current location and the another indication, based on the another approximate current location of the terminal and the predicted or observed mobility of the terminal, how frequently to request the location of the terminal from the location management function or enhanced-serving mobile location center.

8. The method as claimed in claim 7, further comprising:
   receiving, from the terminal, an access request for accessing the network before the location request is sent;
   allowing the terminal to access the network before the indication of whether the terminal is inside of the area is received; and
   stopping the terminal from accessing the network when the indication of whether the terminal is inside of the area indicates that the terminal is not inside of the area.

9. The method as claimed in claim 7, further comprising:
   determining that the terminal is close to a border of the area before sending the location request to the location management function or enhanced-serving mobile location center.

10. The method as claimed in claim 7, wherein the indication whether the terminal is inside of the area is comprised in an information element associated with at least two values, one value indicating that the terminal is inside of the area, and the other value indicating that the terminal is not inside of the area.

11. The method as claimed in claim 7, wherein the accuracy requirement of the location of the terminal is variable based on an initial approximate current location of the terminal.

12. The method as claimed in claim 7, wherein the method is performed by an access management function.

* * * * *